United States Patent [19]
Stone et al.

[11] Patent Number: 5,374,010
[45] Date of Patent: Dec. 20, 1994

[54] DEFLECTED SLIPSTREAM VERTICAL LIFT AIRPLANE STRUCTURE

[75] Inventors: Charles R. Stone, Golden Valley; Richard T. Stone, Minneapolis, both of Minn.

[73] Assignee: E.G.R. Company, Minneapolis, Minn.

[21] Appl. No.: 125,235

[22] Filed: Sep. 23, 1993

[51] Int. Cl.⁵ ............................................. B64C 29/00
[52] U.S. Cl. ................................. 244/12.5; 244/23 D; 244/55; 244/45 R
[58] Field of Search ............ 244/45 R, 12.1, 12.5, 244/12.3, 23 R, 23 A, 23 D, 7 C, 7 R, 55; D12/333, 340, 341, 343, 344, 335

[56] References Cited

U.S. PATENT DOCUMENTS

| | | | |
|---|---|---|---|
| D. 135,995 | 7/1943 | Floren | D12/333 |
| D. 148,595 | 2/1948 | Thieblot | D12/335 |
| D. 159,110 | 6/1950 | Thieblot | D12/335 |
| D. 160,842 | 11/1950 | Burnelli | D12/335 |
| D. 164,843 | 10/1951 | Burnelli | D12/335 |
| 1,704,831 | 3/1929 | Herbert | 244/45 R |
| 2,406,588 | 8/1946 | Cornelius | 244/45 R |
| 2,910,254 | 10/1959 | Razak | 244/45 R |
| 3,096,043 | 7/1963 | Labussiere | 244/12.5 |
| 3,136,499 | 6/1964 | Kessler | 244/7 C |
| 4,709,880 | 12/1987 | Bradfield et al. | 244/15 |
| 5,115,996 | 5/1992 | Moller | 244/12.5 |

Primary Examiner—Michael S. Huppert
Assistant Examiner—Anne E. Bidwell
Attorney, Agent, or Firm—Leo Gregory

[57] ABSTRACT

A vertical lift and short takeoff airplane achieving a powered lift which is generated by deflecting downward on the order of nearly 90° the slipstream from the driven propellors by means of the wing flap system of the airplane.

13 Claims, 7 Drawing Sheets

DEFLECTED SLIPSTREAM VERTICAL LIFT AIRPLANE STRUCTURE

BACKGROUND OF THE INVENTION

1. Field of Invention

Vertical lift aircraft embodying a deflected propellor slipstream to generate the lifting force.

2. Description of the Previous Art

The development of propellor driven vertical lift aircraft is a fairly new development. There appear to be three main types of this development.

One type is to achieve vertical lift by the use of tilting powered propellor units. All other type is to achieve vertical lift by use of tilting wings. The third type is to achieve vertical lift by use of a deflected propellor airstream.

Each type appears to satisfy a different demand. The tilting powered propellor unit version is best for aircraft carrying more than twenty five passengers (5000 pounds of payload) at speeds up to 300 miles per hour. The tilt wing version appears to be best for an airplane carrying on the order of fifteen passengers (3000 pounds of payload) at speeds up to 400 miles per hour. The deflected propellor stream version appears to best serve a plane of a size to carry on the order of six to eight passengers (1500 pounds of payload) at speeds to 250 miles per hour.

Proposed herein is the development of the deflected propellor stream version. This version has decided advantages based on simplicity and structural integrity. However each of the three versions, as indicated, serves a specific market area.

SUMMARY OF THE INVENTION

It is a principal object herein to provide an airplane for vertical takeoff by deflection of the propellor airstream with a wing flap system.

It is another object to provide high aerodynamic efficiency and harmonized control capabilities.

It is another object herein to embody the airplane with a forward swept wing arrangment to allow the disposable loads to be near the center of gravity and yet provide excellent visibility for the pilot.

It is a further object herein to provide a structural arrangement which will yield adequate control and performance throughout the flight in the presence of any control or power failure and to have such control available after such failure to continue flight.

With reference to the previous object, it is also an object herein to use a plurality of engine powered propellor units mounted in spaced relation across a fixed wing or fixed wings that can safely in any flight operate with any engine powered propellor unit failure and avoid pitch transients of the airplane.

It is also an object to provide a relatively low cost structure using high production components and avoiding the need for the design and manufacture of special parts, such as power couplers by arranging for the use of off the shelf items.

A basic structure for the airplane to accomplish the objects indicated may include a structure embodying a single wing or having two or more wings having engines positioned thereon so that in normal flight the lift forces generated are distributed to balance generally about the center of gravity of the airplane structure.

These and other objects and advantages of the invention will be set forth in the following description made in connection with the accompanying drawings in which like reference characters refer to similar parts throughout the several views.

DESCRIPTION OF THE PREFERRED EMBODIMENT

The drawings of the several figures herein are described as wire frame three dimensional representations and these are representations of the outer surfaces of the airplane structures described herein.

Figure 1:
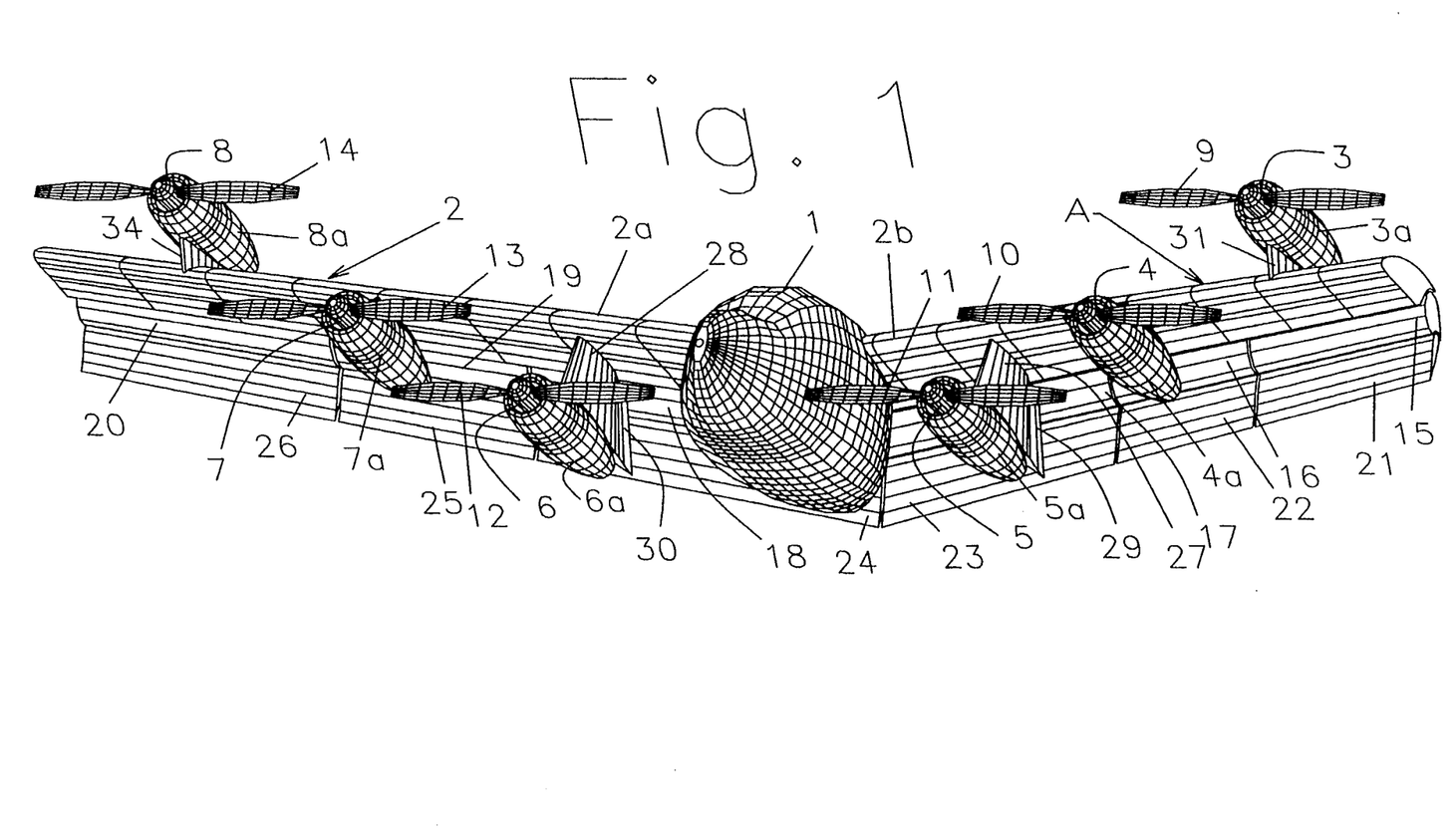
FIG. 1 is a front elevational view perspective.
Figure 1A:
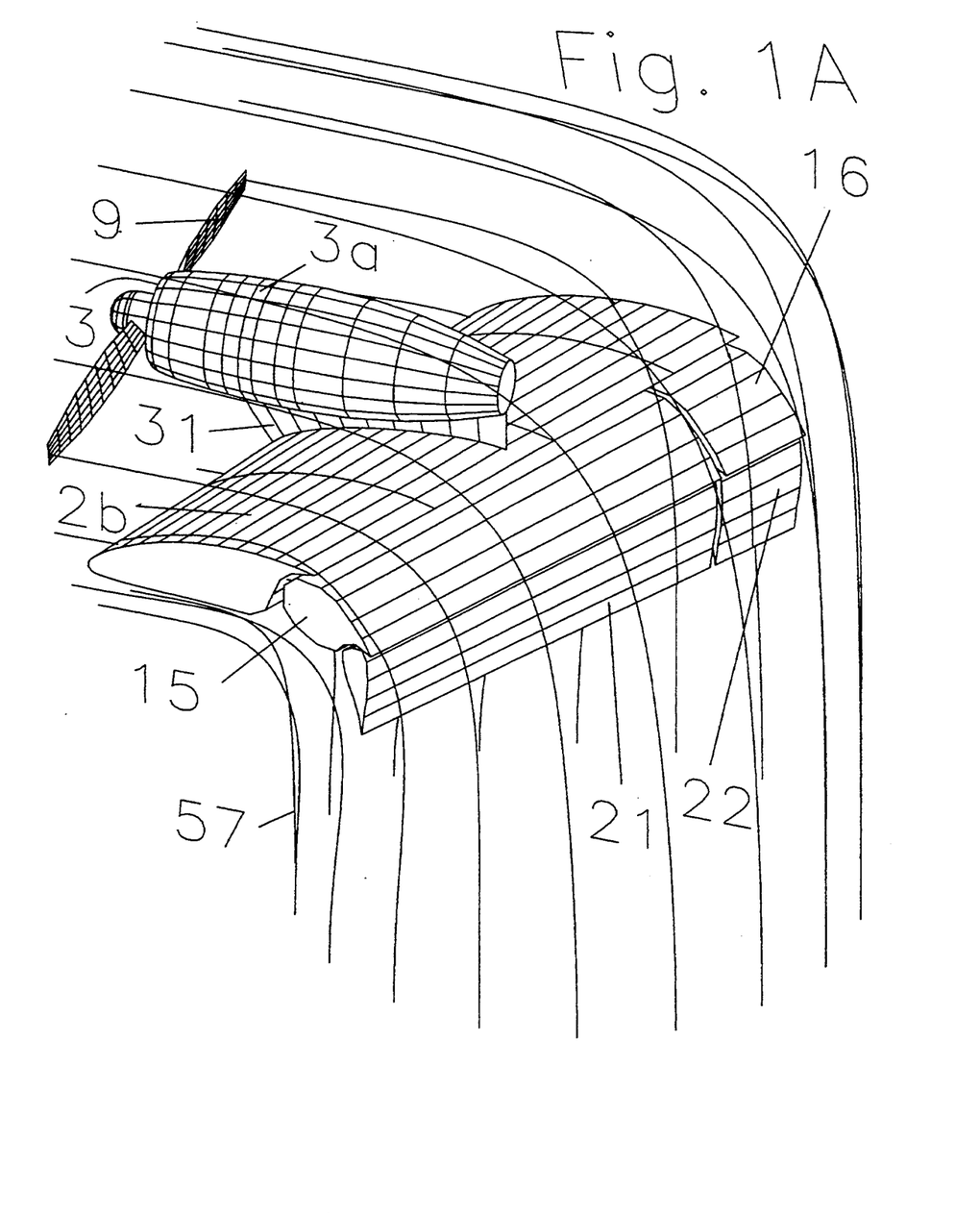
FIG. 1A is a rear perspective view of the left wing tip section illustrating the deflection of the airstream.
Figure 2:
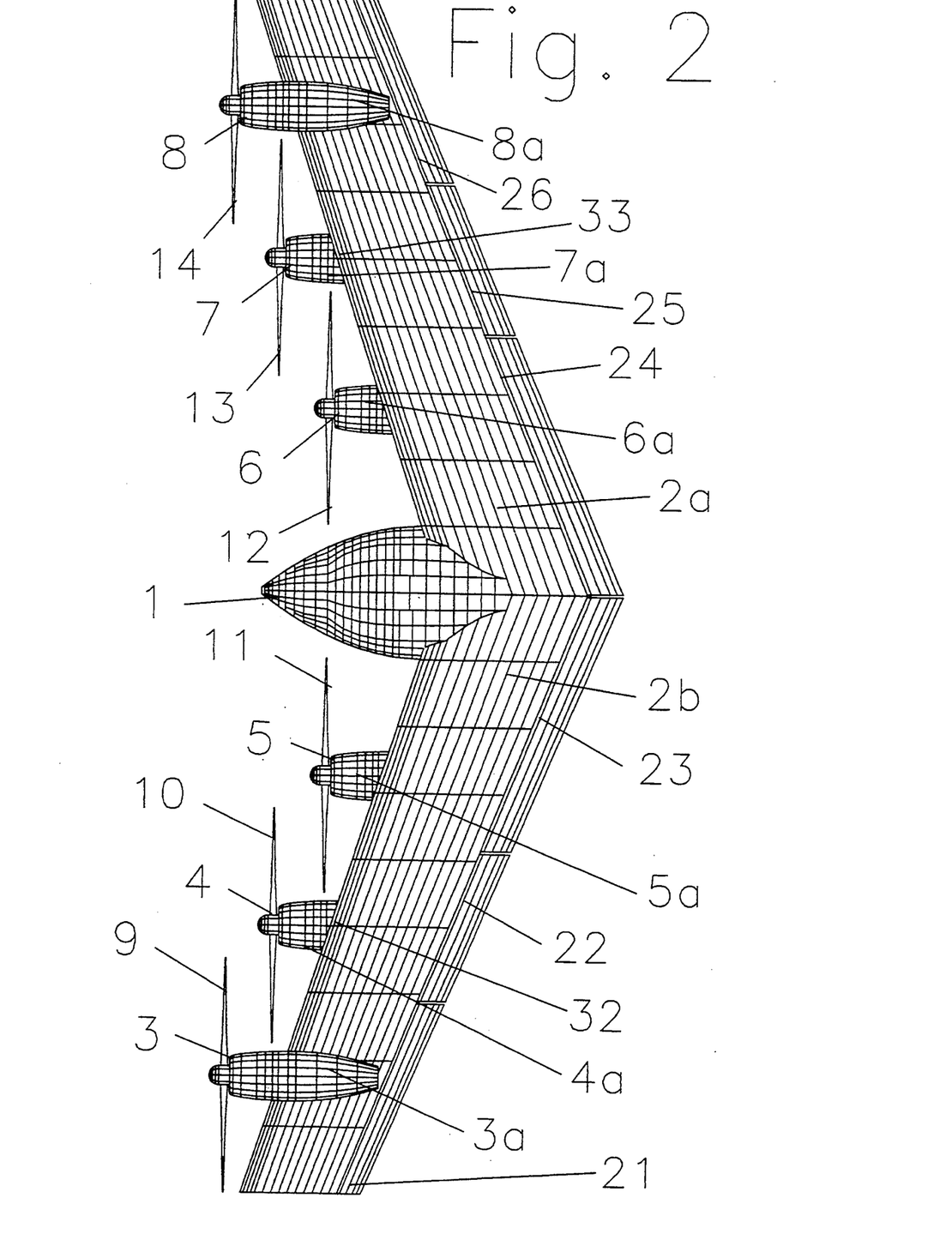
FIG. 2 is a top plan view.
Figure 3:
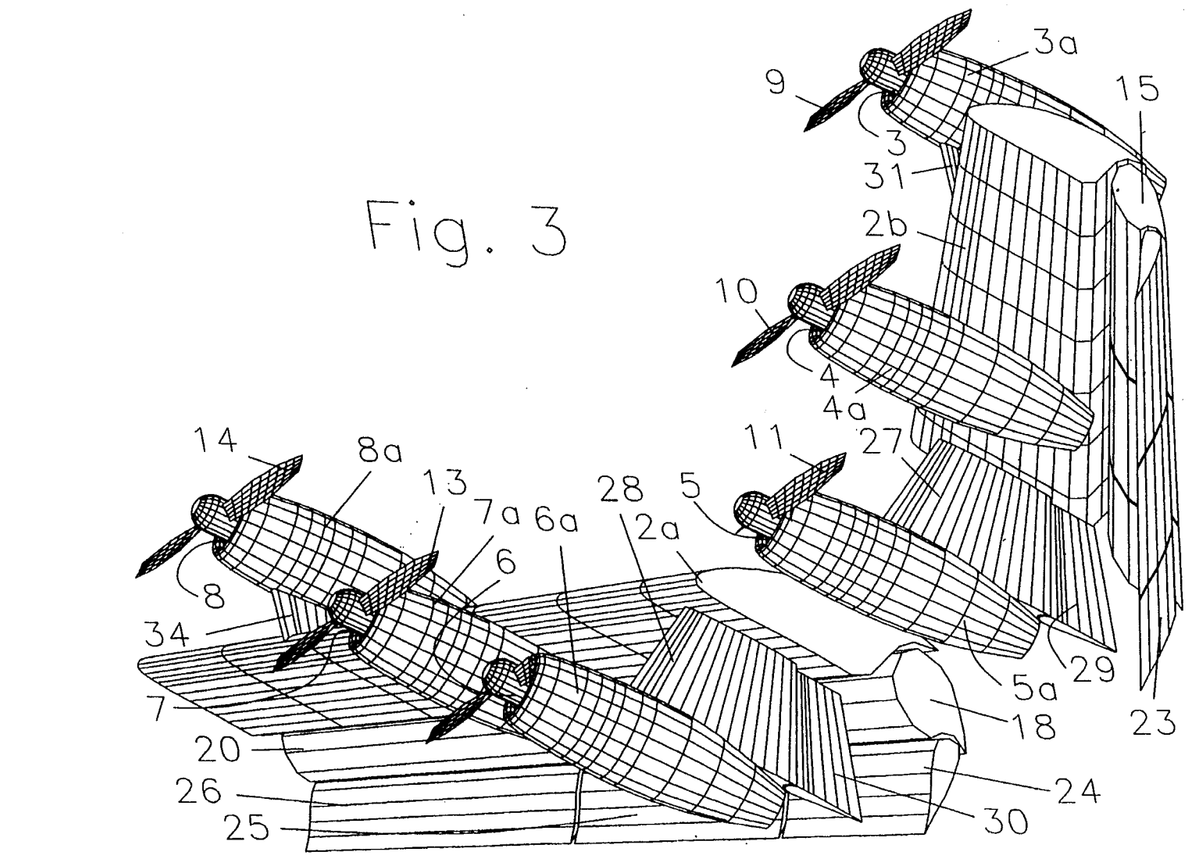
FIG. 3 is a bottom view in perspective with the fuselage and adjacent portions of the wing removed and the wings being swept forwardly.

In FIGS. 1-3, shown is a wing swept forward single wing airplane indicated by reference character A and a wing 2 comprising sections 2a and 2b conventionally mounted and secured at either side of the airplane fuselage 1. Said wing is set high on the fuselage. There are three variations in wing placement for reasons to be subsequently presented. In one variation the center of gravity is designed to be near 0.15 of the mean aerodynamic chord, in the second near 0.35 of the mean aerodynamic chord, and in the third it is near 0.25 of the mean aerodynamic chord.

Spanning said wing are six engines 3–8 housed in conventional nacelles 3a–8a and mounted onto said engines respectively to be driven thereby are propellors 9-14. The engines 5 and 6 are referred to as being inboard, the engines 3 and 8 are referred to as being outboard, and the engines 4 and 7 are referred to as being intermediate. The engines, as such, are not seen. They are housed in their respective nacelles but a forward portion of each engine as indicated projects to have a propellor mounted thereon.

The outboard of said engines, namely 3 and 8, are mounted atop said wing adjacent each end thereof and carried under said wing spaced in relation are engines 4-7.

Three or more engines are necessary to achieve the benefits of controllable flight in the presence of a failed engine and without employing what is known in the industry as power couplers. Thus the airplane structure herein is adapted to fully yield adequate control and performance throughout the flight.

Figure 6:
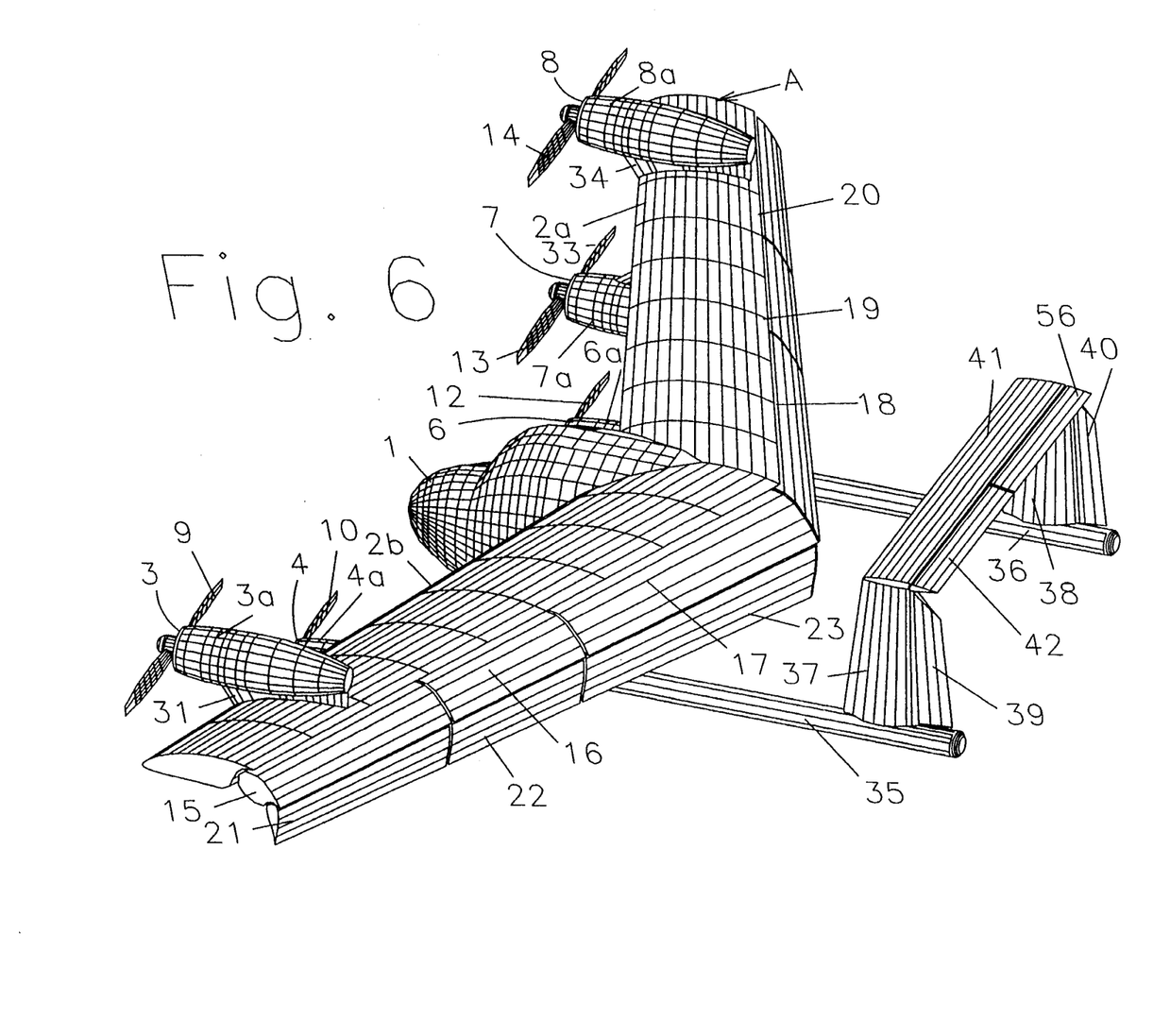
FIG. 6 is a rear perspective view of a single wing airplane horizontal stabilizer and vertical stabilizer appendages.

The engines and their respective propellors as mounted on said wing extend forwardly of said wing as indicated in FIGS. 2 and 6. It is necessary for the average position of the propellors to extend below the wing to permit symmetric trim during hover.

Said wing 2 is constructed to have top elevons 15-17 in the wing section 2b and elevons 18-20 in wing section 2a with respective top tabs 21-23 and 24-26.

The propellors 9-14 as powered by their respective engines 3-8 push the air back over the wing 2. In hover and low speed flight the deflected elevons 15-20 and the top tabs 21-26 of FIGS. 1 and 3, as indicated in FIG. 1A for elevons 15-16 and top tabs 21-22, redirect the propelled air or airstream downwardly approximately 90° to develop upward lift.

Shown in FIGS. 1 and 1A, at the left end of wing section 2b (right end as viewed), the top elevon 15 and top tab 21 form, sectionwise or streamwise, a double slotted section. The elevon 15 and top tab 21 are conventionally individually controllable, by means not here shown, so that both section values of lift and moment coefficients are controllable. Three or more control surfaces may be used to both increase airstream turning efficiency and turning angle. However only two motions need to be independent for section lift and moment control.

The wing 2 is rigidly connected to the fuselage 1 as has been indicated. The number 3 and 8 engine housing nacelles 3a and 8a are rigidly connected to said wing with respective pylons 31 and 34. The nacelles 5a and 6a are rigidly connected to said wing by fins 27 and 28, The nacelles 4a and 7a are connected to said wing by pylons 32 and 33.

The pylon 33 is clearly shown in FIG. 6 and the pylons 32 and 33 are seen in FIG. 2.

The top elevons 15-20 are hingedly connected to the wing 2 and have independent movement by conventional means provided but not shown here. The top tabs 21-26 are hingedly connected to their respective top elevons 15-20. Conventional means not shown are provided to independently move said top tabs relative to their respective elevons. The same are approximately centered behind their respective propellors.

On three engined airplanes the trailing edge control surfaces extend into the slipstream of the center engine to provide rolling moments while operating in single (center) engine hover.

Rigidly attached to said wing sections 2a and 2b respectively are fins 28 and 27. Rudders 29 and 30 are hingedly connected at their leading edges to wing connected fins 27 and 28 which are aft of the inboard engines. Conventional means not shown are provided to move said rudders independently. The fin and rudder volume coefficients are small relative to contemporary airplane practice but are adequately sized for both hover and normal airplane flight.

Said elevons, tabs, and rudders may be and are referred to collectively as aerodynamic control surfaces or trailing edge control surfaces.

Conventional means not shown are provided to independently adjust the power of each of said engines. The propellors 9-14 may be of the fixed pitch type in which case no means of adjustment is provided. In some forms, each of the propellors may be provided with any one or more of collective pitch control, pitch cyclic control, or yaw cyclic control. In these cases, independent conventional means are provided for control.

The top plan view of FIG. 2 shows the forward sweep of the wing which permits the pilot to sit forward in the fuselage having good visibility and any passengers or other payload are grouped in this area, all being close to the center of gravity.

FIGS. 1-3 show the top elevons 15-20 and the top tabs 21-26 are approximately centered behind their respective propellors 9-14.

Conventional horizontal stabilizers and vertical stabilizers may be added to increase the amount of angle of attack and angle of sideslip stability, respectively. Conventional elevators and rudders may be added to increase the amount of angle of attack and angle of sideslip controllability, respectively.

FIG. 6 shows such a modification for the airplane structure above described.

Booms 35 and 36 are rigidly attached to the rear of the nacelles 5a and 6a. Vertical stabilizers 37 and 38 are rigidly mounted on top of said booms rearwardly thereof. A horizontal stabilizer 41 is secured to the top of said fins 37 and 38. Elevators 42 and 56 are hingedly connected to the rear of said stabilizer 41. Rudders 39 and 40 are hingedly connected to the rear of said fins 37 and 28.

Figure 4:
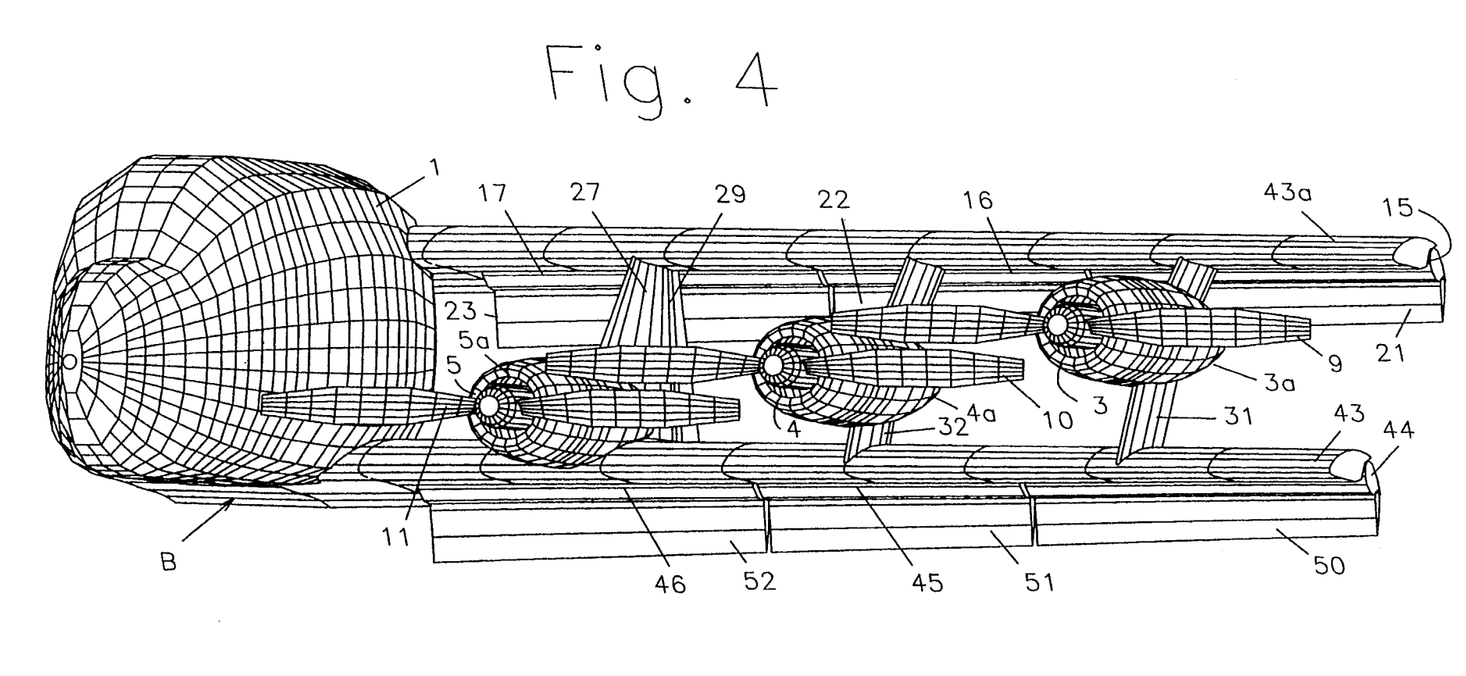
FIG. 4 is a modification showing a biplane in front elevation with the left wing extending from the fuselage which is in perspective.
Figure 5:
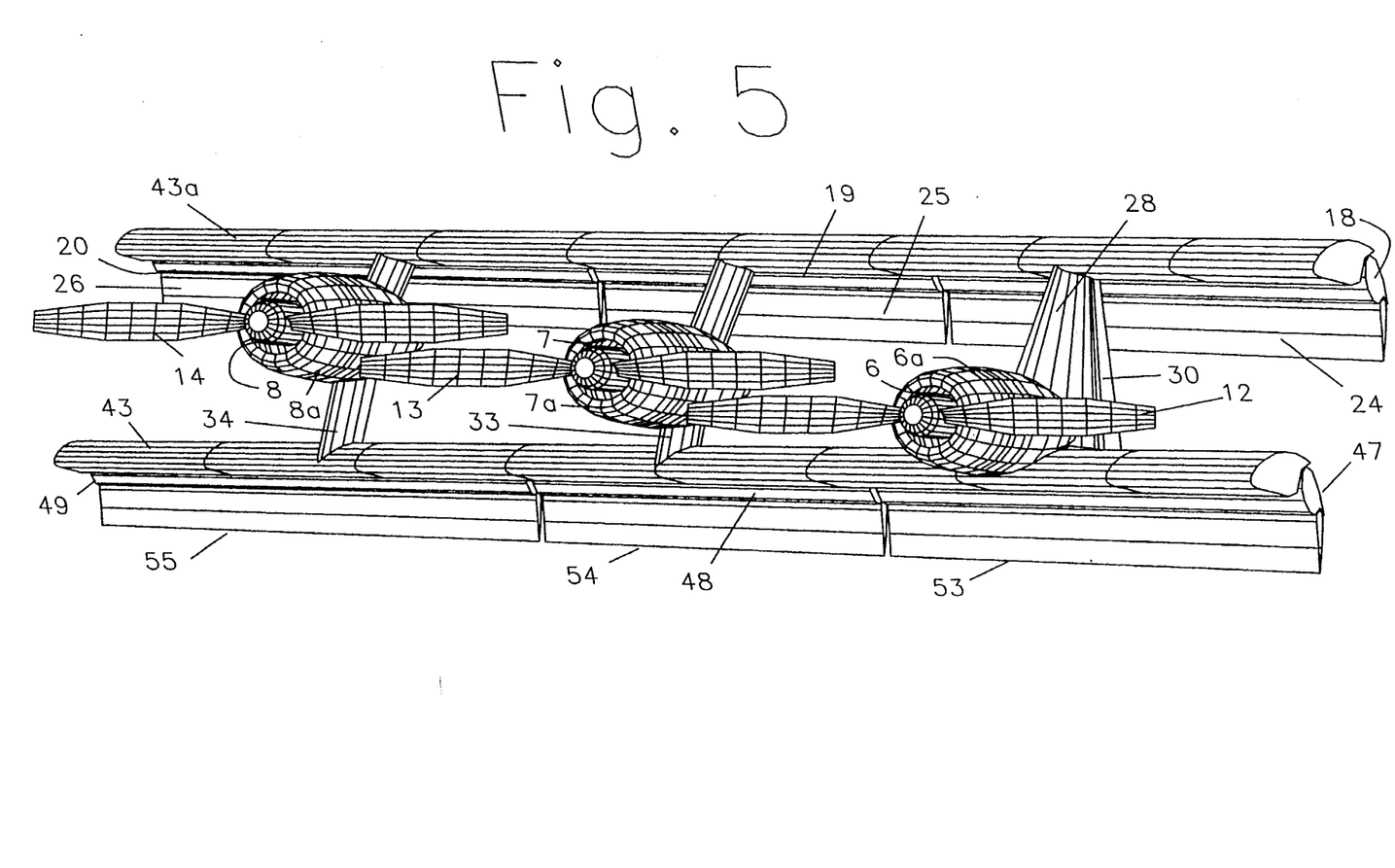
FIG. 5 with reference to FIG. 4, shows the other wing section in front elevation.

FIGS. 4 and 5, taken together as a modification of the single wing airplane above described, show a swept forward wing biplane B having a structural arrangement similar to that of the single wing A above described with the exception of the addition of a bottom wing 43 which is secured to said fuselage in the manner of said single wing 2. Also the bottom elevons 44 to 49 and bottom tabs 50 to 55 are connected with the bottom wing in a manner similar to the way the elevons 15-20 and tabs 21-26 are connected to wing 2. The top wing 43a of said biplane is similar to said wing 2 of said single wing airplane A.

Like reference numbers are used herein for like parts described previously in the single wing airplane A.

The biplane B, which is representative of a multiwing airplane structure, uses negative stagger, that is, the top wing 43a is aft of the bottom wing 43 to provide good sectional airstream flow, in particular with the flaps and tabs deflected downward during hover and low speed flight. Because of stagger, it is possible, for control purposes, to use only one set of trailing edge control surfaces sectionwise on each wing. However for wholly efficient control and slipstream deflection capabilities, two or more should otherwise be used. For basic operation only two independent sectionwise control deflections need be provided.

The propellors 9-14 are forwardly positioned of the leading edge of the bottom wing 43 as in connection with the forward swept single wing airplane A and also of any live payload which may be aboard. It is necessary for the average position of the propellors to extend below the top of the top wing to permit symmetric trim during hover.

The outboard propellors 9 and 14 where the wings are most forward are mounted the highest. The propellors 11 and 12 where the wing sections are most aft are lowest. The propellors 10 and 13 are intermediate as with the single wing airplane A, the position of the propellors 9-14 is important both for effecting trim in hover and low speed flight and in minimizing control motion requirements to compensate for engine failure. This same arrangement of propellors and their respective engines is in effect with the above single wing airplane and avoids pitch of the airplane in the event of a power failure.

The pylons 31-34 connect rigidly to the bottom wing 43 and to nacelles 3a, 4a, 7a and 8a. Similarly the fins 27 and 28 connect rigidly to the bottom wing 43 and to nacelles 5a and 6a. The pylons 31-34 and fins 27 and 28 carry to and through rigidly the nacelles 3a-8a to connect rigidly to the top wing 43a.

The biplane may lift greater payloads than comparable single wing planes but may have somewhat lower cruise speeds.

The airplanes of FIGS. 1–5 do not have horizontal or vertical stabilizers which saves weight and improves hover control near the ground. Hover control is more difficult with the stablizers in place because air bounces off the ground and into the stabilizers creating undesirable disturbance forces on the airplane.

The single wing and two wing airplanes above described, as indicated, embody forward swept wings. This configuration is particularly applicable for airplanes having less than eight seats. For airplanes seating eight persons, it is advantageous to use swept back wings because of favorable aeroelastic effects.

The swept back wing version puts the fins and rudders aft of the outboard engines. The pilot sits up front of the fuselage with good visibility and the passengers (or cargo) are spaced in multiple rows behind the pilot or pilots as the case may be. The propellors are forward of the wing leading edges and on the average are below the top of the top wing to facilitate pitch trim during hover. The outboard propellors are mounted the lowest, the inboard propellors are mounted the highest, and the intermediate propellors are mounted at intermediate heights to avoid pitch transients due to engine failure during hover.

The remainder of the airplane structure is the same as on the forward swept versions, both relating to the centering of gravity.

The total wing area of the single wing plane A and of the biplane B tailored for the same mission are about the same. As the number of wings is increased, the total wing area is decreased somewhat because of increased airflow deflection capability and increased turning efficiency. Each wing of the biplane has the same span and area. The biplane chords are about one half of those for the single wing airplane. The angles of incidence of the biplane wings are about the same but a little decalage may be used and the wings are negatively staggered about 0.5 chord both for more pitch controllability and for better hover efficiency.

The basic operation of both the single wing and the two wing airplanes above described are very much alike although reference is made to the single wing airplane.

The wing flap system of the airplane comprises the fixed wing and independently controllable elevons and tabs so that both values of lift and moment coefficients are independently controllable. The wing flap system converts the propellor thrust into wing lift. Lift and thrust forces increase on the order of 90% of the increase in engine power.

FIG. 1A, as representative of wing action in flight, illustrates the left wing tip portion of the airplane in hover flight. Power from the engine 3 drives propellor 9. The propellor forces a columnar stream of air rearward with high velocity as indicated by the streamlines 57 emanating from the periphery of the propellor 9. The left wing section 2b, elevons 15 and 16, and tabs 21 and 22 comprise a wing flap system. The entire column of air passing rearward form the propellor passes over and under the wing and this entire column is deflected on the order of 90° downward. The change in vertical momentum component of air by the wing flap system generates the lifting reaction force on the wing flap system to support the airplane.

The structures as above described provide for performance and adequate control thereof throughout a flight in presence of failure of any control or power source. Sufficient control, authority and power therefore are available, after a failure, to continue flight. The total amount of engine power to achieve this control decreases with increased numbers of engines. An engine failure display is available to the pilot.

Now to be considered is failure during hover and low speed flight. With all engines operating, the structure described is flyable in hover and low speed flight by the average helicopter pilot. However an engine failure during hover or low speed flight requires special considerations. Considerations are different for a three engine airplane than one having more engines, such as six.

Because of the arrangement of the engines relative to the lifting systems, consideration is given to (1) an increase in power to maintain equilibrium lift, (2) the correct spanwise adjustment of power to maintain roll trim, and (3) minor adjustment of the control surfaces, namely, elevons, tabs, and rudders to maintain the other trims.

Also to be considered are lift carryover, lifting efficiency, and efficiency of the propellors.

The engines are positioned so there is little if any overlap spanwise. Thus each propellor affects the wing section directly aft of it.

The efficiency of the wing flap system in converting propellor thrust to wing lift is almost totally independent of thrust level.

Propellor thrust increases with increase in shaft input power but only to the extent on the order of 90% of the increase.

In an airplane having three engines, if the center engine fails, the pilot is to increase the effective thrust on the outboard propellors by 50% and make minor trim adjustments with the trailing edge controls. If an outboard engine fails, he shuts down the other outboard engine and increases the thrust on the center propellor by 200%. This could be automated.

With more than three engines, there are options in procedure which relate to simplicity and efficiency. The simple procedure maintains spanwise symmetry. The most efficient procedure is to use the minimax thrust.

The simple procedure is similar to that used on the three engined airplanes. With any odd number of engines if there is a failure of the center engine, power is simply increased on the outboard engines. With any number of engines, if there is a failure of an engine outboard of the center engine, the corresponding symmetrically disposed engine is shutdown and power increased on the remaining operating engines.

For a six engined airplane, the simple procedure requires that an engine failure during hover or low speed flight be balanced by shutting down a corresponding disposed engine and by increasing thrust of the active propellors to 150% of their unfailed values.

Where the airplane has more than three engines, it is more efficient to adjust the power on the remaining engines to achieve the minimum of the maximum power on the remaining engines; i.e., find and use the minimax power solution.

A six engined airplane is used to illustrate these solutions with the engines disposed at 1/12, $\frac{1}{4}$, and 5/12 the wingspan distance from the centerline thereof.

If engine 6 fails, retain the thrust on propellor 9 at 100%; increase the thrust on propellors 10, 11, 13 and 14 to 125%; and make minor trim adjustments with the trailing edge controls.

If engine 7 fails, reduce the thrust on propellor 9 to 54.6%; increase the thrust on propellors 10, 11, 12 and 14 to 136.4%; and make minor trim adjustments with the trailing edge controls.

If engine 8 fails, reduce the thrust on propellor 9 to zero; increase the thrust on propellors 10, 11, 12, and 13 to 150%; and make minor trim adjustments with the trailing edge controls.

Thus the failure of a single engine during powered lift hover and low speed flight can be safely accommodated.

In conventional airplane flight, the failure of more engines can be accommodated. In the event of failure of all engines the airplane operates satisfactorily as a glider of moderate wing loading.

We now discuss in some detail the stabilization and control of the airplanes, first the antisymmetric and then the symmetric.

The antisymmetric motions of the airplane are those that describe the out of plane motions of the plane of symmetry. There are three: roll rate angular motion, yaw rate angular motion, and lateral linear velocity.

At hover, velocities are small and there is negligible damping. Roll rate is achieved by the rolling moment generated with spanwise differential lift by use of the elevons and tabs. Yaw rate is achieved by the yawing moment generated with rudders and spanwise differential thrust by use of engines, elevons and tabs. Lateral velocity is achieved primarily by developing bank angle through the time integration of roll rate; secondarily the rudder side force assists. The average helicopter pilot would have no difficulty in hovering with these controls.

In high speed flight, antisymmetric control is as on the conventional airplane: elevons control roll rate, rudders control lateral velocity, and bank angle is used to achieve yaw rate.

The vertical stabilizers increase sideslip static stability. The addition of rudders provide the required control authority to overcome the additional sideslip static stability.

The symmetric motions of an airplane are those that describe the inplane motions of the plane of symmetry. There are three: pitch rate, forward linear velocity, and heave linear velocity (normal to the forward linear velocity).

At hover, velocities are small and there is negligible damping. The heave velocity is achieved by the normal force generated with spanwise symmetrical lift by use of the elevons and tabs. Pitch rate is achieved by the pitching moment generated with spanwise symmetrical pitching moment developed by operating the elevons and tabs to yield moment without a change of lift. The forward velocity is achieved by the gross thrust generated with spanwise symmetrical thrust by use of the engines, elevons, and tabs. The average helicopter pilot would have no difficulty in hovering with these controls.

There are three variations of the airplane that have marked effects on high speed flight and conventional airplane unpowered low speed flight: 1) The center of gravity is near the 0.15 mean aerodynamic chord position and there is no horizontal stabilizer, 2) the center of gravity is near the 0.35 mean aerodynamic chord position and there is no horizontal stabilizer, 3) the center of gravity is near the 0.25 mean aerodynamic chord position and there is a horizontal stabilizer.

Variation 1 has the largest angle of attack stability, the least symmetric control response in conventional airplane flight and the poorest performance as a short takeoff conventional airplane.

Variation 2 has both the best symmetric control response in conventional airplane flight and the best performance as a short takeoff conventional airplane.

Variation 3 has good symmetric control response in conventional airplane flight, good performance as a short takeoff conventional airplane, and suffers moderate disturbances in hover near the ground.

Variations 1 and 2 would be referred to as flying wing airplanes.

On these aircraft, if the center of gravity is forward of 0.25 of the mean aerodynamic chord, a) the airplane is stable, b) the elevons must be deflected downward with increasing speed to effect level flight trim, and c) the elevons must be deflected upward to increase load factor (initial load factor response direction is opposite the desired terminal direction; i.e., nonminimum phase). Variation 1 airplane a) has the elevons in the low lift (rather than the high lift) position at low airplane speeds, b) has poor short period reponse.

On these aircraft if the center of gravity is aft of 0.25 of the mean aerodynamic chord, a) the airplane is unstable, b) the elevons must be deflected upward with increasing speed to effect level flight trim, and c) the elevons must be deflected downward to increase load factor (initial load factor response direction is the same as the desired terminal direction; i.e., minimum phase). Variation 2 airplane a) has the elevons in the desired high lift position at low airplane speeds, b) has excellent short period response.

By adding the horizontal stabilizer with its elevators as in variation 3, much of the benefit of variation 2 is achieved although hover controllability is somewhat degraded. A larger range of center of gravity position is allowable.

In conventional airplane flight control is an in conventional airplanes. The combined pitch rate and heave velocity responses are generated with symmetric elevons and elevators (if available). The forward velocity is achieved by the gross thrust generated with spanwise symmetrical thrust.

It will of course be understood that various changes may be made in the form, details, arrangement and proportions of the invention without departing from the scope of the invention, which, generally stated, consists in a product capable of carrying out the objects above set forth, in the parts and combination of parts disclosed and defined in the appended claims.

What is claimed is:

1. A deflected propellor slipstream vertical lift airplane structure, comprising
a fuselage,
wing means in connection with said fuselage,
said wing means being secured to the fuselage having a section thereof extending outwardly of each side of the fuselage,
three or more engines spanning said wing means, inboard of said engines being adjacent said fuselage and outboard of said engines being outwardly of said fuselage,
a first means to independently adjust the power of each of said engines,
propellors being respectively carried by said engines and extending forwardly of their adjacent leading edges of said wing means and whose average height is below the top of the wing means to permit symmetric trim during hover, each propellor being independently driven by its respective engine without the use of power couplers between propellors, two or more independently controllable trailing edge control surfaces being mounted streamwise on each of said wing means to independently control wing section lift and moment, said trailing edge control surfaces each being adjacent an engine and being split spanwise across their adjacent engines to be respectively thus isolated in the event of failure of an engine, a propellor, or a wing control surface, a vertical fin with a trailing edge rudder being mounted forward of the wing control surfaces and behind each of two of said engines to be effective in horizontal and vertical flight, a second means to control the movement of each of said trailing edge control surfaces, said second means adapted to operate with any engine power failure or control surface failure without the use of power couplers, whereby said wing means trailing edge control surfaces deflect downwardly a slipstream passing thereby from said propellors to generate lift in hover and low speed flight.

2. The structure of claim 1, wherein the center of gravity of the said wing means is on the order of 15% of the mean aerodynamic chord whereby in conventional landings and takeoffs the wing trailing edge control surfaces function as wing flaps.

3. The structure of claim 1, wherein the center of gravity of the said wing means is on the order of 35% of the mean aerodynamic chord whereby in conventional flight symmetric motions are inherently stabilized.

4. The structure of claim 1, wherein said propellors have fixed pitch.

5. The structure of claim 1, wherein said wing means being forwardly swept and positioned such as to have the center of gravity located to permit the pilot of the airplane to sit forwardly in the fuselage and have good visibility, said two vertical fins with their trailing edge rudders being mounted forward of the wing means trailing edge control surfaces and behind the inboard engines to be effective in both horizontal and vertical flight, and said propellors and their respective engines nearest the fuselage being positioned lower than said propellors and their engines outwardly thereof adapting the airplane to avoid a pitch motion in the event of a power failure.

6. The structure of claim 1, wherein said wing means are rearwardly swept and positioned such as to have the center of gravity located to permit the pilot of the airplane to sit forwardly in the fuselage and the passengers or/cargo be placed aft near the center of gravity, said two vertical fins with their trailing edge rudders being mounted forward of the wing means trailing edge control surfaces and behind the outboard engines to be effective in vertical flight, and the propellors and their respective engines nearest the fuselage being positioned higher than said propellors and their engines outwardly thereof thereby adapting the airplane to avoid a pitch motion in the event of a power failure.

7. The structure of claim 1, wherein
said wing means comprises a single wing.

8. The structure of claim 1, wherein
said wing means comprises a top and a bottom wing, and
said top wing is aft of the bottom wing in a negative stagger position.

9. The structure of claim 1, wherein
a vertical stabilizer with a trailing edge rudder mounted aft of each inboard of said engines on the order of three chord lengths behind the wing means enhancing cruise flight sideslip stability and providing sideslip control, and
a third means to control the position of each rudder.

10. The structure of claim 1, including
a horizontal stabilizer with two trailing elevators mounted on the order of three chord lengths behind and above the wing means enhancing the cruise flight angle of attack stability and providing more pitch control, and
a third means controlling the position of each elevator.

11. A deflected propellor slipstream vertical lift airplane structure, comprising
a fuselage,
a single swept forward wing mounted onto said fuselage extending at either side thereof,
three or more engines spanning said wing, an inboard of said engines being adjacent said fuselage and outboard of said engines being at each outer end portion of said wing outwardly of said fuselage,
a first means to independently adjust the power of each of said engines,
propellors being respectively carried by said engines and extending forwardly of their adjacent leading edges of said wing and whose average height is below the top of the wing permitting symmetric trim during hover,
each propellor being independently driven by its respective engine without the use of power couplers between propellors,
the propellors and their respective engines nearest the fuselage being positioned lower than said propellors and their engines outwardly thereof, adapting the airplane to avoid pitch motion in the event of a power failure,
two or more independently controllable trailing edge control surfaces being mounted streamwise on said wing for independent wing section lift and moment control,
said trailing edge control surfaces each being adjacent an engine and being split spanwise across their adjacent engines and thus isolated in the event of the failure of an engine, a propellor, or a wing control surface,
a vertical fin with a trailing edge rudder being mounted forward of the wing control surfaces and behind each of said inboard engines to be effective in both horizontal and vertical flight,
a second means to control the movement of each of said trailing edge control surfaces,
said first means adapted to operate said airplane structure with any engine power failure or control surface failure without the use of power couplers,
whereby said wing trailing edge control surfaces deflect downwardly a slipstream passing thereby from said propellors to generate lift in hover and low speed flight.

12. A deflected propellor slipstream vertical lift airplane structure, comprising a fuselage, a single swept back wing mounted onto said fuselage extending at either side thereof, three or more engines spanning said wing, inboard of said engines being adjacent said fuselage and outboard of said engines being outwardly of said fuselage, a first means to independently adjust the power of each of said engines, propellors being respectively carried by said engines and extending forwardly of their adjacent leading edges of said wing and whose average height is below the top of the wing for symmetric trim in vertical flight, each of said propellors being independently driven by its respective engine without the use of power couplers between said propellors, the propellors and their respective engines nearest the fuselage being positioned higher than said propellors and their engines outwardly thereof, adapting the airplane to avoid pitch motion in the event of power failure, two or more independently controllable trailing edge control surfaces being mounted streamwise on said wing for independent wing section lift and moment control, said trailing edge control surfaces each being adjacent an engine and being split spanwise across their adjacent engines and thus isolated in the event of the failure of an engine, a propellor, or a wing control surface, a vertical fin with a trailing edge rudder being mounted forward of said wing control surfaces and behind each of said outboard engines to be effective in both horizontal and vertical flight, a second means to control the movement of each of said trailing edge control surfaces, said first means adapted to operate with any engine power failure or control surface failure without the use of power couplers, whereby said wing trailing edge control surfaces deflect downwardly a slipstream passing thereby from said propellors to generate lift in hover and low speed flight.

13. A deflected propellor slipstream vertical lift airplane structure, comprising a fuselage, an upper and lower wing in the negative stagger configuration secured to the fuselage having sections extending outwardly of said fuselage at each side thereof, three or more engines spanning said wings, inboard of said engines being adjacent said fuselage and outboard of said engines being outwardly of said fuselage, a first means to independently adjust the power of each of said engines, propellors being respectively carried by said engines and extending forwardly of their adjacent leading edges of the lower wing and whose average height is below the top of the upper wing to permit pitch trim during hover, each propellor being independently driven by its respective engine without the use of power couplers between propellors, two or more independently controllable trailing edge control surfaces being mounted streamwise on each of said wing for independent wing section lift and moment control, said trailing edge control surfaces each being adjacent an engine and being split spanwise across their adjacent engines and thus isolated in the event of the failure of an engine, a propellor, or a wing control surface, a vertical fin with a trailing edge rudder being mounted forward of said wing control surfaces and behind each of said outboard engines to be effective in both horizontal and vertical flight, a second means to control the movement of each of said trailing edge control surfaces, said first means being adapted to operate with any engine power failure or control surface failure without the use of power couplers, whereby said wing trailing edge control surfaces deflect downwardly a slipstream passing thereby from said propellors to generate lift in hover and low speed flight.

* * * * *